Feb. 18, 1969    JUN WATANABE ET AL    3,428,494
METHOD FOR MANUFACTURING A DRY CELL
Filed April 25, 1966
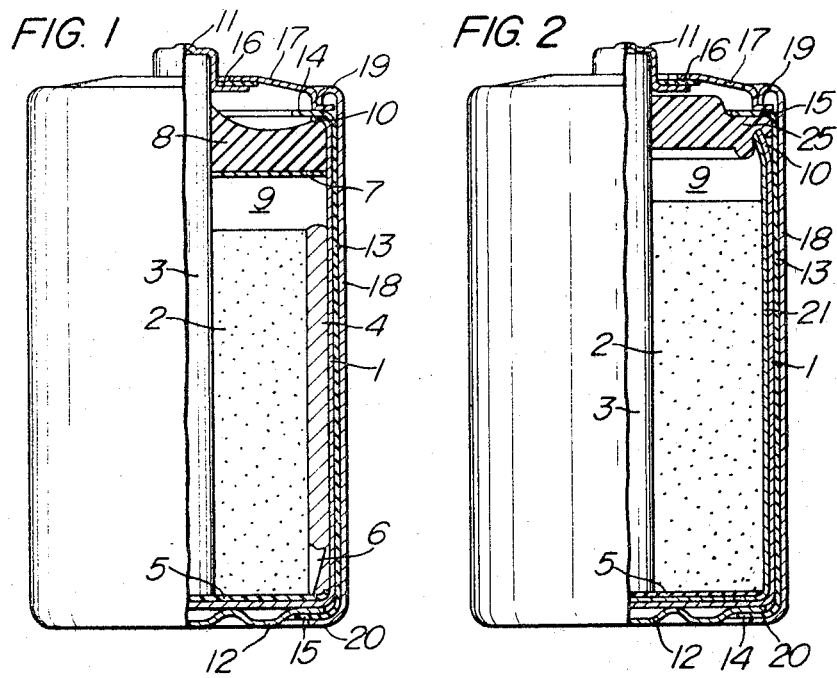
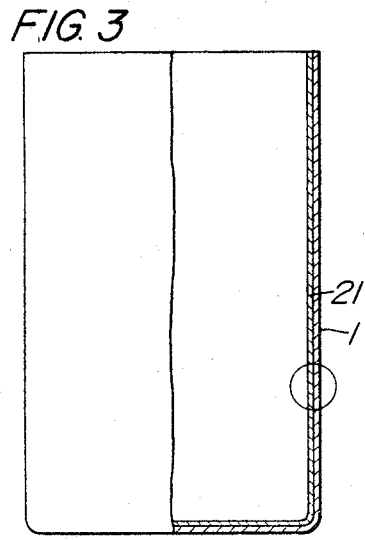
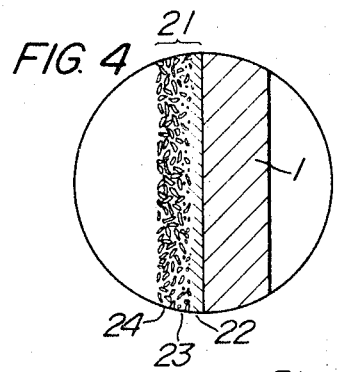
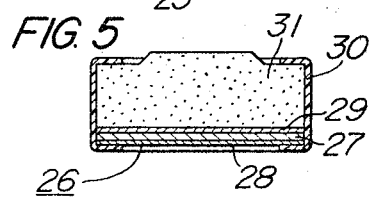

United States Patent Office

3,428,494
Patented Feb. 18, 1969

3,428,494
METHOD FOR MANUFACTURING A DRY CELL
Jun Watanabe, Kobe, Susumu Hosoi, Osaka, Hiroaki Izawa, Moriguchi-shi, Tadashi Sawai, Kyoto, and Koichiro Kawakami, Kurume-shi, Japan, assignors to Matsushita Electric Industrial Co., Ltd., Osaka, Japan, a corporation of Japan
Filed Apr. 25, 1966, Ser. No. 544,744
Claims priority, application Japan, Apr. 28, 1965, 40/25,772, 40/25,773, 40/25,774, 40/25,775, 40/25,776, 40/25,777; May 13, 1965, 40/28,989; May 26, 1965, 40/31,580; June 29, 1965, 40/39,613
U.S. Cl. 136—102    4 Claims
Int. Cl. H01m 13/08

ABSTRACT OF THE DISCLOSURE

A dry cell comprising a zinc anode having a paste deposit consisting of three layers, the surface of said anode facing to a cathodic mixture wetted with a wetting liquid mainly composed of water and then having the wetted surface stuck with a water soluble or water swelling paste powder, in said layers the layer near the wetted surface being in film form wherein the paste power is in the state of swelling and soluble, the intermediate layer being in the state of half-swelling and half-soluble, and the surface layer being in a powder form. An electrolyte is held in said paste, and the cathodic mixture opposed to said zinc anode through said paste deposit. The zinc anode and the paste deposit are assimilated and closely stuck together, and a major portion of the paste is in a form of power or of near powder with the surface thereof in contact with the electrolyte, and it easily absorbs the electrolyte and is rapidly swollen and dissolved to be expanded. But since before absorbing the electrolyte the paste deposit is extremely thin, the diameter of the cathodic mixture is larger than in a conventional cell, whereby an increase in the discharge performance of the dry cell can be expected.

---

The present invention relates to an improvement of a dry cell comprising a zinc electrode, a cathodic or depolarizer mixture consisting chiefly of manganese dioxide and graphite or acetylene black, and an electrolyte layer having an electrolyte consisting chiefly of ammonium chloride and zinc chloride supported in the paste of said layer composed of starch or carboxymethyl cellulose, etc.

In more detail, the present invention relates to a process for the formation of an electrolyte layer comprising the steps of; wetting the surface of a zinc electrode opposite to a cathodic mixture with a wetting solution consisting chiefly of water, attaching a powder chiefly consisting of a water-soluble or water-swellable gelatinizing material to the wet surface and applying to the surface of the gelatinizing reagent or material layer thus formed an electrolyte to be supported thereby, and to a dry cell comprising such an electrolyte layer.

The present invention is also applicable to a dry cell or an elementary cell of a layer built dry battery comprising a carbonaceous cathodic collector disposed at the outermost portion of the cell and zinc electrode, either having a planary shape or having a raised portion at each side edge, disposed interior of said cathode.

The present invention has for its object the provision of a dry cell which is large in capacity, excellent in preservability as well as in resistance against leakage of electrolytic solution, and easy to manufacture.

The present invention will now be illustrated by way of example below with reference to the accompanying drawings, in which:

FIGURE 1 is a side view of a cylindrical dry cell of the conventional type with the essential portion thereof shown in section;

FIGURE 2 is a side view of a cylindrical dry cell embodying the present invention with the essential portion thereof shown in section;

FIGURE 3 is a side view of the dry cell in a production stage, showing essential portion of the zinc container in section;

FIGURE 4 is an enlarged cross sectional view of the essential portion of the zinc container shown in FIG. 3; and FIGURE 5 is a vertical cross sectional view of an elementary cell of a layer built dry battery in which the present invention is embodied.

First of all, a conventional dry cell will be described with reference to FIG. 1. The dry cell shown in FIG. 1 comprises a consumable anode 1 made of zinc; and a cathodic mixture 2 primarily consisting of manganese dioxide and graphite, a carbon rod 3 inserted in said cathodic mixture 2 at the center thereof, an electrolytic solution layer 4 primarily consisting of ammonium chloride and zinc chloride, solidified by gelatination with a starchy material, a bottom separation paper 5 and a thin paper guide 6 for holding said cathodic mixture 2 at the center of the cell, all of which are disposed within said consumable anode 1. A circular paper collar 7 having formed at its center a through-hole for the insertion of the carbon rod 3 therethrough and having its peripheral edge contacting with the inner wall of the zinc container is disposed in the opening of the zinc container and a sealing compound 8 consisting of pitch, asphalt and wax, etc. is disposed on the top of said circular paper collar to thereby seal the opening of the zinc container. Between the collar 7 and the cathodic mixture 2 is provided an expansion space 9 for storing the electrolytic solution 4 therein which is expanded and fluidized during the use of the dry cell.

A metal cap 11 is mounted on the top end of the carbon rod 3 so as to serve as a positive terminal, while a metallic bottom plate 12 is placed at the bottom of the zinc container 1 in abutting relation therewith so as to serve as a negative terminal. Reference numeral 13 indicates an insulating cylinder fitted over the side surface of the zinc container 1, said insulating cylinder being made of such material as paper, plastic film laminated paper or synthetic resin, and upper end 14 of said insulating cylinder 13 is bent along the curved edge 10 of the zinc container 1, while the lower end 15 thereof is bent along the peripheral edge of the bottom plate 12. An insulating ring 16 is mounted on the cap 11 and a metallic sealing plate 17 is mounted on the top of the ring 16. Reference numeral 18 is a cylindrical casing made of paper, synthetic resin or metal and the upper and lower ends 19 and 20 of said casing 18 are bent over the peripheral edges of the sealing plate 17 and the bottom plate 12 respectively, thereby sealing the dry cell entirely.

The electrolytic solution layer 4 is normally formed by dispersing a starchy material, such as wheat flour or corn starch, in an electrolytic solution primarily consisting of ammonium chloride and zinc chloride to give a fluid solution, pouring the fluid solution in the zinc container 1, then inserting the cathodic mixture 2 into the fluid solution forcing the fluid solution to rise in the space solution, pouring the fluid solution in the zinc container 1, then inserting the cathodic mixture 2 into the fluid the fluid solution is solidified upon being gelatinized.

The foregoing method, however, has the drawback that the thickness of the paste layer 4 must be made greater than a certain limit, e.g., it must be about 2 mm. for a dry cell of the UM–1 type (ASA D size, IEC R20) in view of displacement of the fluid solution before gelatination and also from the standpoint of prevention of the cathodic mixture from contacting with the zinc container during the insertion operation of said cathodic mixture, and consequently the diameter of the cathodic mixture is limited in size. Needless to say, capacity of dry cell (duration of discharge) increases in proportion to the weight of the cathodic mixture and this weight, in turn, is proportional to the diameter of the cathodic mixture in the manner of geometric progression, and as such it is preferable for the cathodic mixture to have a greater diameter. In view of this, the drawback mentioned above as possessed by conventional dry cells is not ignorable and much less can it be ignored in recent days when dry cells are being used in a variety of applications and a dry cell of a greater capacity is called for with an increasing demand for dry cells.

In an attempt to make the diameter of a cathodic mixture large, a number of methods have been proposed heretofore. The method which has been practiced most commonly is the use of a water absorbing paper, such as craft paper. Namely, this method comprises lining a cathodic mixture with a craft paper which is previously coated with a paste solution and dried and inserting the lined cathodic mixture into a zinc container containing an electrolytic solution therein. This is the so-called paper-lined system. This method, however, has the drawbacks that the production process is complicated somewhat and that the paper used constitutes an ohmic resistance.

Attempts have also been made in that a cathodic mixture is lined with a water-soluable film or the film is applied to the inner surface of a zinc container, or further a layer of the film is formed directly on the inner surface of a zinc container or on the surface of a cathodic mixture and then the cathodic mixture is inserted in the zinc container containing an electrolytic solution. However, none of these methods were satisfactory because the film provides a smaller surface area due to the smoothness of its surface and as a result the absorption of electrolytic solution by the film is slowed down, making it impossible to give a sufficient amount of the electrolytic solution to the film which forms a paste layer. Insufficient absorption of electrolytic solution by the paste layer results in shorter discharging capacity and greater degradation of performance after storage.

The object of the present invention, therefore, is to provide a dry cell which is large in capacity and excellent in preservability, by the formation of a paste layer of a small thickness and capable of quickly absorbing an electrolytic solution, said paste layer being formed by attaching a paste powder primarily consisting of a water-soluble or water-swellable reagent to the surface of a zinc electrode which has previously been wetted with a wetting solution primarily consisting of water.

An example of a cylindrical dry cell to which the present invention is applied will be illustrated. Referring to FIG. 3, reference numeral 21 indicates a paste layer attached to the entire inner surface of a zinc container 1 in a uniform thickness. This paste layer 21 is formed by first wetting the inner surface of the zinc container 1 with water and thereafter attaching a water-soluble or water-swellable gelatinizing reagent, such as powdery methyl cellulose or polyvinyl alcohol, to the water-wetted surface by sprinkling, which is followed by drying. As shown in FIG. 4, while a layer 22 of the gelatinizing reagent layer 21 adjoining the zinc container 1 is tightly bonded to the inner surface of the zinc container 1 in the state of a thin film after having been swollen with and dissolved in the water present on said surface and dried, an intermediate layer 23 is swollen and dissolved to a less extent than the layer mentioned and a front layer 24 is attached substantially in a powdery state.

For producing a dry cell using the zinc container 1 with the paste layer formed on the inner surface thereof, a suitable amout of an electrolytic solution is poured in the container 1, following which a cathodic mixture 2 having a carbon rod 3 planted at the center thereof is inserted in said container, whereupon the electrolytic solution is forced to rise in the space defined by the zinc container 1 and cathodic mixture 2, thus wetting the paste powder. Since a large proportion of the paste is attached in a powdery state or a state approximating thereto, the paste contacts the electrolytic solution in a large area, so hat it expands immediately due to swelling or water-swellable reagent to the surface of a zinc container and the cathodic mixture. Alternatively, the electrolytic solution may be poured into the space between the zinc container and the cathodic mixture after insertion of the cathodic mixture in said zinc container, or an excessive amount of the electrolytic solution may be added to the cathodic mixture beforehand so that the electrolytic solution percolates from the cathodic mixture and is transferred to the layer 21.

Reference numeral 25 in FIG. 2 indicates a sealing closure made of a soft synthetic resin, such as, for example, polyethylene, said closure having a through-hole at its center for the insertion of a carbon rod 3 therethrough and an annular groove formed in the underside of its periphery for receiving the flexed edge portion 10 at the top end of the zinc container 1 therein.

The gelatinizing reagent used in the present invention may be any one, provided that it is either water-soluble or water-swellable and can be divided into powder at the ambient temperature, and cellulose derivatives, such as methyl cellulose, ethyl cellulose, hydroxyethyl cellulose, ethylhydroxyethyl cellulose and celluosic gluconates; synthetic pastes, such as methacrylic acid esters, acrylic acid esters, polyvinyl alcohol and polyethylene oxide; and processed starches and starch derivatives, such as various starch ethers, starch esters, alpha starch and amylopectin, are also used. These gelatinizing reagents may be added, as required, with a starchy material, such as wheat flour, corn starch or bridged starch, which does not swell with cold water but swells with such electrolytic solution as zinc chloride, to improve their electrolytic solution retaining property or with a reinforement, such as short fiber produced by pulverizing pulp substantially into a powdery state, to improve the strength of the gelatinizing reagent layer. Still further, these gelatinizing reagents, may be added with a ultra fine particle of silicon dioxide, such as that sold by Degussa Company under the trade name of Aerosil, to improve the fluidity of the gelatinizing reagent powder and to prevent the flowing down of the gelatinizing reagent attached to the surface of the zinc container due to its thixotropic effect. The Aerosil is silicon dioxide having a particle size of about 15 microns and is being used in a wide range of applications. The addition of the Aerosil to a powder of chemical compound is effective in increasing the fluidity of the powder and also in preventing re-coagulation of the powder. The water used for wetting the gelatinizing reagent may be ordinary city water, ion exchanged soft water or distilled water, and it may be added, as required, with a surface active agent, such as, for example, polyoxyethylene glycol alkylphenyl ether, so that the water may be attached uniformly to the inner surface of the zinc container. In this case, if foam occurs by the addition of the surface active agent, a trace amount of a silicone defoaming agent is added to eliminate the foam. It is also possible to add to the water a slight amount of a water-soluble, highly viscous material, which may be the same as the paste powder to be attached, so as to increase the viscosity of the water, whereby a larger amount of water can be attached to the surface of the zinc container and accordingly a larger amount of paste powder can be attached to said surface. Drying of the paste powder attached may be accelerated by the addition of an organic solvent whose boiling point is lower than that of water and which is mutually soluble with water, such as ethyl alcohol or methyl alcohol. Also by the use of a solution of such an electrolytic material as zinc chloride or ammonium chloride in water, in lieu of water, it is possible to contain the electrolytic material in the paste layer beforehand. Substantially the same result as by the use of a paste powder admixed with the starch may be obtained by the use of water in which starch particles are previously dispersed and suspended.

One of the most important things in attaching the paste powder is the amount in which the paste powder is attached, i.e. thickness and uniformity of the paste layer formed. The thickness may be adjusted, as has been described previously, by increasing the amount of the paste powder attached which is attainable by increasing the viscosity of water and also by adjusting the particle size. The experiment conducted by the present inventors has revealed that the particle size satisfactory for use in the present invention is about 20 mesh or finer and most preferably 50 mesh through in terms of the Tyler Standard Sieve. A better result may be obtained with a powder in which the individual particle sizes vary from large to small successively, rather than with a powder of a constant size. It should be noted, however, that the use of a powder of an excessively large size tends to cause pinholes in the film obtained. On the other hand, the use of a powder consisting entirely of particles as fine as 200 mesh reduces the thickness of the film obtained, although the surface condition of the film is satisfactory.

In case of the paste being a cellulose derivative, the powder microscopically shows the state of a short fiber and the longer the fiber is, the more paste will be attached. The methods described, however, generally tend to form a paste layer having a rough surface and an inconsistent thickness wherein, for example, the thickness is greater at the bottom portion. Such a defect may be obviated by wetting the inner surface of the container with water, and thereafter attaching a powder and again wetting the surface of the powder layer with water for further attachment of the powder repeatedly. An excessively thin paste layer presents a cause of electrical shorting between the zinc electrode and the cathode mixture, while an excessively large thickness of the paste layer results in a smaller diameter of the cathodic mixture which is objectionable to the attainment of the object of the present invention. According to the experiment conducted by the present inventors, the thickness of the paste layer is preferably in the range from about 0.10 to 0.35 mm. on drying and most preferably in the range from about 0.15 to 0.25 mm. On the other hand, the space between the inner surface of the zinc container and the surface of the cathodic mixture is preferably in the range from about 0.3 to about 1.0 mm. and most preferably in the range from 0.5 to 0.8 mm. where the thickness of the paste layer is from 0.15 to 0.25 mm. on drying. The use of a paste layer as being wet, without drying, is advantageous in eliminating the steps of drying and injecting an electrolytic solution but such a method is not necessarily satisfactory, because, since the paste layer is in an expanded state, it is impossible to make the diameter of the cathodic mixture sufficiently large and, in addition, it is possible for the paste layer to be damaged during insertion of the cathodic mixture. For these reasons, it is recommendable to dry the paste layer wherever possible. In FIG. 3, the paste powder is attached to the entire inner surface of the zinc container but it needs not be attached to the portion above the cathodic mixture and the bottom portion of the container, as these portions are not directly concerned with the power generation of the dry cell. Nevertheless, according to the experiment conducted by the present inventors, it is recommendable to attach the paste powder also to these portions of the zinc container from the standpoint of preventing electrical shorting between the inner surface of the zinc container and the cathodic mixture during the insertion operation of the latter into said container due to direct contact therebetween and preventing leakage of the electrolytic solution through the bottom of the container.

In attaching the paste powder in two or more steps to obtain a desired thickness of the paste powder layer as described previously, the paste powder to be attached for the second step and onwards may preferably be different from that attached for the first time in material. For instance, the paste for the first attachment may primarily be consisting of one which is easily soluble in water or the electrolytic solution, or which has good adhesiveness to the zinc container, or which contains a larger proportion of starchy material or starch derivatives, while the paste for the second attachment may primarily be consisting of one which contains none of or only a small amount of such materials as starchy material and starch derivatives, which apt to reduce manganese dioxide in the cathodic mixture, or which is comparatively insoluble in water or the electrolytic solution, or which swells upon absorption of the electrolytic solution and provides for the passage of ions but forms an insoluble film.

Although many methods can be used for the attachment of the paste powder, the method to be employed basically comprises first wetting the entire inner surface of the zinc container by such means as filling the container with water and pouring the water out of the container, placing an excessive amount of the paste powder in the container and turning the container in the inverted position, whereupon the powder is attached to the inner surface thereof uniformly and an excess of the powder drops out of the container, and thereafter drying the powder as attached to the surface of the container. When the paste powder is to be attached in more one steps, the container with the paste powder attached to the inner surface thereof in the first step is further filled with water and, after pouring the water out, an excessive amount of a paste powder is placed in the container again and the container is turned in the inverted position, whereupon the powder is attached to the inner surface of the first paste layer and the excess powder drops out of the container. The powder thus attached is dried as it is. In this case, the second powder attaching operation may be carried out successively without effecting the first drying. Besides the methods described, water or the paste powder may be attached by projecting the same against the inner surface of the container. It is also possible to attach the paste powder in accordance with the principle of the so-called fluid-dipping method which comprises heating an article to which a powder is desired to be attached and dipping the article in a fluidized thermoplastic powder. Namely, it is a method in which the inner surface of an article, that is the zinc container in the instant case, is wetted with water, following which the article is dipped in a fluidized paste powder to thereby attach the powder to the inner surface of said article. This method, however, has the drawback that the powder can hardly be attached to the bottom of a bottomed hollow cylinder, since the method is primarily intended for the attachment of a powder to the inner wall of the cylindrical body.

Although the foregoing description refers to a dry cell of the type wherein a zinc electrode simultaneously serves as the container for an elementary cell, it should, of course, be understood that the present invention is also applicable to dry cells, for example, of a flat shape. Such dry cells include layer built dry batteries, cathodicenvelope type dry batteries and inside-out type dry cells.

In describing the flat cell using for layer built dry battery with reference to FIG. 5, a carbon-zinc plate 26 is composed of a zinc electrode 27 and a carbonaceous film 28 provided underside of said zinc electrode 27, said carbonaceous film serving as a cathodic collector. A paste layer 29 is formed by wetting the zinc surface of the plate 26 with water and thereafter attaching to said surface a water-soluble or water-swellable paste powder, which is followed by drying.

Then, an adhesive is applied to the peripheral edge of the carbon film 28 of the plate 26 to which the lower flexed edge of the polyvinyl chloride tube 30 is bonded to form a casing. In the casing thus formed is poured an electrolytic solution and, after insertion of a cake of depolarizer mixture therein, the upper edge of the tube 30 is flexed inwardly, whereupon an elementary cell 31 is produced.

The dry cell of the present invention has a small internal resistance and an excellent preservability, because the paste layer is bonded firmly to the zinc electrode, is strong and thus is not damaged during the insertion of the cathodic mixture as the layer is formed by attaching a water-soluble or water-swellable paste powder to the inner surface of the zinc electrode by the use of water, and it absorbs the electrolytic solution quickly as the paste powder is attached in a powdery state or a state approximating thereto. In addition, according to the present invention, it is possible to increase the capacity of a dry cell, because whereas the diameter of the depolarizer mixture of a conventional cell of the UM-1 type (ASA D size, IEC R20), for example, is about 26 mm., that of the dry cell of the present invention can be made as large as about 29 mm. Another advantage of the claimed dry cell is that, since paper as used in a paper-lined cell is not used, the production process is rendered simple and there is no increase of internal resistance due to the paper. Moreover, since the paste used does not primarily consist of starch, the paste reacts with manganese dioxide in the depolarizer mixture or with the zinc electrode to a less extent during the storage, which improves the preservability of the dry cell. Further advantages of the claimed dry cell are that the dry cell has better resistance against the leakage of electrolytic solution than the conventional cells, which has been proved by the experiment, although the reason therefor is not understood, and that it generates a less amount of gas during storage and consequently the dry cell is subjected to substantially no expansion and deformation.

Next, the advantageous feature of the present invention will be illustrated below by way of example. An elementary dry cell having a size equal to that of the UM-1 type (ASA D; IEC R20) was produced by wetting the inner surface of a zinc container with water added with 0.5% of a surface active agent (a product of Union Carbide Chemicals Company being marketed under the trade name of Tergitol NP 25), placing a paste powder, which is a mixture of 60 parts of methyl cellulose (a product of Dow Chemical Company being marketed under the trade name of Methocel HG 1000), 20 parts of hydroxyethyl cellulose (a product of Union Carbide Chemicals Company being marketed under the trade name of Cellosize WP 3) and 20 parts of polyethylene oxide (a product of Union Carbide Chemicals Company being marketed under the trade name of Polyox WSR-35), in said container to thereby attach said paste powder to the inner surface thereof, immediately thereafter wetting the surface of the paste layer thus formed with water containing a surface active agent, again placing the aforementioned paste powder in said container to thereby form a layer of said paste powder on the top of the previously formed paste layer, with the subsequent drying of the paste layers for about 30 minutes at 60° C., pouring 3.5 g. of an electrolytic solution consisting of 10 parts of ammonium chloride, 20 parts of zinc chloride and 70 parts of water and immediately thereafter inserting a depolarizer bobbin consisting of 55 parts of electrolytic manganese dioxide, 10 parts of acetylene soot, 5 parts of zinc chloride, 12 parts of ammonium chloride and 18 parts of water and having a diameter of 29 mm., a height of 43 mm. with a carbon rod having a diameter of 8 mm. planted at the center thereof. The elementary dry cell produced in the manner described was used to produce a dry cell A having a construction shown in FIG. 2, which was compared to a conventional dry cell B as shown in FIG. 1 (whose depolarizer bobbin is of the same composition as that of the dry cell A but has a diameter of 26 mm. and a height of 40 mm.) and a paper-lined cell C, with the result shown in the table below:

|  | A | B | C |
|---|---|---|---|
| Weight of depolarizer bobbin (g.) | 52 | 39 | 50 |
| Discharge Test (1): | | | |
| Immediately after production (min.) | 1,250 | 700 | 1,100 |
| After storage for 12 months (min.) | 1,100 | 500 | 900 |
| Discharge Test (2): | | | |
| Immediately after production (hr.) | 260 | 190 | 245 |
| After storage for 12 months (hr.) | 240 | 160 | 210 |
| Leakage Test (1): Number of cells showing leakage out of 20 cells | 0 | 7 | 5 |
| Leakage Test (2): Number of cells showing leakage out of 20 cells | 0 | 12 | 3 |

The values of the Discharge Test (1) represent the total of discharge time expressed in terms of minutes, which was obtained by intermittently discharging the cell for 4 minutes with a 11 minute rest time under a load of resistance of 4 ohms for a period of 8 hours every day until the voltage dropped to 0.9 v. in accordance with the Heavy Industrial Flashlight Test set forth in A.S.A. C18.1, while the values of the Discharge Test (2) represent the total of discharge time expressed in terms of hour, which was obtained by discharging the cell under a load of resistance of 40 ohms for a period of 4 hours every day until the voltage dropped to 0.9 v. in accordance with the Transistor Test set forth in I.E.C. Publication 86. The values of the Leakage Test (1) represent the number of cells which showed leakage of the electrolytic solution to the exterior surface of the cell when the cell was left to stand for 15 days under no load condition after discharging the cell for 24 hours under a load of resistance of 5 ohms in accordance with the Leakage Test set forth in MIL. STD. 18c, whereas the values of the Leakage Test (2) represent the number of cells which showed leakage of the electrolytic solution to the exterior surface of the cell when the cell was left to stand for 60 days under a load of resistance of 40 ohms, said tests having been conducted at a temperature of 20° C.

It is quite obvious from the table above that the dry cell A of the present invention excels the conventional cells in discharge time, preservability against aging and in leakage test. The present invention which provides a dry cell which is simple in production and excellent in performance, is therefore of great industrial advantage.

What is claimed is:

1. A method for manufacturing a dry cell comprising the steps of wetting the inner surface of an annular zinc anode can with a liquid consisting solely of water, depositing a water soluble and water swellable gelatinizing reagent powder onto the wetted surface, drying the deposited gelatinizing reagent to form a deposit consisting of three layers in which the reagent in the layer adjacent the zinc anode is a thin film in which the powder is swollen and dissolved, the reagent in the intermediate layer is half-swollen, half-dissolved, and the reagent in the layer adjacent the cathodic mixture is in a powdery state, then inserting a cathodic mixture and electrolyte into the zinc anode can, contacting the powdery layer adjacent the cathodic mixture with electrolyte to swell said layer whereby the space between the zinc anode can and the cathodic mixture is filled with the gelatinizing reagent deposit.

2. A method according to claim 1, further comprising inserting the electrolyte into the zinc anode can and then inserting the cathodic mixture into the zinc anode can to push the electrolyte into contact with the gelatinizing reagent deposit.

3. A method according to claim 1, wherein the cathodic mixture is introduced containing excess electrolyte and the gelatinizing reagent deposit is swollen by electrolyte.

4. A method according to claim 1, wherein the cathodic mixture is inserted into the zinc anode can leaving a space between the zinc anode can and cathodic mixture, and the electrolyte is injected into said space whereby the gelatinizing reagent deposit is swollen by the electrolyte.

References Cited

UNITED STATES PATENTS

| | | | |
|---|---|---|---|
| 1,437,603 | 12/1922 | Mackensie et al. | 136—129.1 |
| 2,551,799 | 5/1951 | Hatfield | 136—129 |
| 2,938,064 | 5/1960 | Kordesch | 136—102 |
| 3,255,049 | 6/1966 | Wolfe | 136—83 |
| 3,257,237 | 6/1966 | Jacke | 136—6 |

WINSTON A. DOUGLAS, *Primary Examiner.*

C. F. LE FEVOUR, *Assistant Examiner.*

U.S. Cl. X.R.

136—125

UNITED STATES PATENT OFFICE
CERTIFICATE OF CORRECTION

Patent No. 3,428,494　　　　　　　　　　　　　　February 18, 1969

Jun Watanabe et al.

It is certified that error appears in the above identified patent and that said Letters Patent are hereby corrected as shown below:

Column 1, lines 24 and 32, "power", each occurrence, should read -- powder --. Column 3, line 6, beginning with "solution, pouring" cancel all to and including "gelatinized." line 8, and inse defined by said cathodic mixture (2) and the zinc container (1) and heating the fluid solution in that state, whereupon the fluid solution is solidified upon being gelatinized. --. Column 4, lin 21, "hat" should read -- that --; line 22, "or water-swellable reagent to the surface of a zinc container and the cathodic mixture." should read -- or dissolution and thus fills the space between the zinc container and the cathodic mixture. --; line 53, "reinforement" should read -- reinforcement --.

Signed and sealed this 31st day of March 1970.

(SEAL)

Attest:

Edward M. Fletcher, Jr.

Attesting Officer

WILLIAM E. SCHUYLER, JR.

Commissioner of Patents